United States Patent [19]

Fisher et al.

[11] Patent Number: 5,121,227

[45] Date of Patent: Jun. 9, 1992

[54] ONE STEP RAINBOW HOLOGRAPHY

[76] Inventors: Gary R. Fisher, 2251 Federal Ave., Los Angeles, Calif. 90064; Murty V. Mantravadi, 21610 Villa Pacifica Cir., Carson, Calif. 90745

[21] Appl. No.: 461,414

[22] Filed: Jan. 5, 1990

Related U.S. Application Data

[62] Division of Ser. No. 122,360, Nov. 18, 1987, Pat. No. 4,925,260.

[51] Int. Cl.$^5$ .............................................. G03H 1/02
[52] U.S. Cl. ........................................ 359/1; 359/3; 359/10; 359/28
[58] Field of Search ...................... 350/3.6, 3.61, 3.67, 350/3.81, 3.83, 6.12, 6.20, 6.27, 6.30, 6.22, 6.16

[56] References Cited

U.S. PATENT DOCUMENTS

| | | | |
|---|---|---|---|
| 3,560,071 | 2/1971 | Silverman et al. | 350/3.67 |
| 3,807,828 | 4/1974 | Johnson et al. | 350/3.67 |
| 4,235,505 | 11/1980 | Hariharan et al. | 350/3.77 |
| 4,484,334 | 11/1984 | Pressley | 350/612 |
| 4,925,260 | 5/1990 | Fisher et al. | 350/3.67 |

FOREIGN PATENT DOCUMENTS

| | | | |
|---|---|---|---|
| 0214222 | 10/1984 | Fed. Rep. of Germany | 350/616 |
| 1004945 | 3/1983 | U.S.S.R. | 350/619 |

OTHER PUBLICATIONS

Benton, S., "Hologram Reconstruction with Extended Incoherent Sources," *J. Opt. Soc. Am.* 59, 15545A (1969).

Chen, H. and F. T. S. Yu, "One-Step Rainbow Hologram," *Opt. Lett.* 2(4), 85 (1978).

Chen. H., Tai, A., and F. T. S. Uy, "Generation of Color Images with One-Step Rainbow Holograms," *Appl. Opt.* 17(10), 1490 (1978).

Hariharan, P., Hegedus, Z. S., and W. H. Steel, "One-Step Multicolour Rainbow Holograms with Wide Angle of View," *Optica Acta* (26(3), 289 (1979).

Leith, E., "White-Light Holograms" *Sci. Am.* 235(4), 80 (1976).

Steel, W. H., and C. H. Freund, "Single-Step Rainbow Holograms without Distortion," *Optics Communications* 51(6), 368 (1984).

*Primary Examiner*—Paul M. Dzierzynski
*Assistant Examiner*—Hung Xuan Dang
*Attorney, Agent, or Firm*—Henry M. Bissell

[57] ABSTRACT

Improved optical holographic apparatuses are disclosed for making white light viewable rainbow holograms in one step utilizing concave mirror optics. On-axis and off-axis configurations are presented for holography of real objects and for reduced image holography of a real image projection from a laser transmission hologram. An optical apparatus and curved recording devices are devised to reduce and/or eliminate certain aberrations introduced by the concave mirror. To yield a wide holographic field of view at low cost, small diameter mirrors are employed in two alternative devices for replacing a single concave mirror in the various embodiments. Two methods are then presented to obtain reduced image size one-step rainbow holograms from a full size object or holographic image. Finally, a method is given for specifying the radius of curvature and minimum effective aperture of a concave mirror system in one step rainbow holography that maintains image aberrations at acceptable levels and yields the desired field of view.

11 Claims, 4 Drawing Sheets

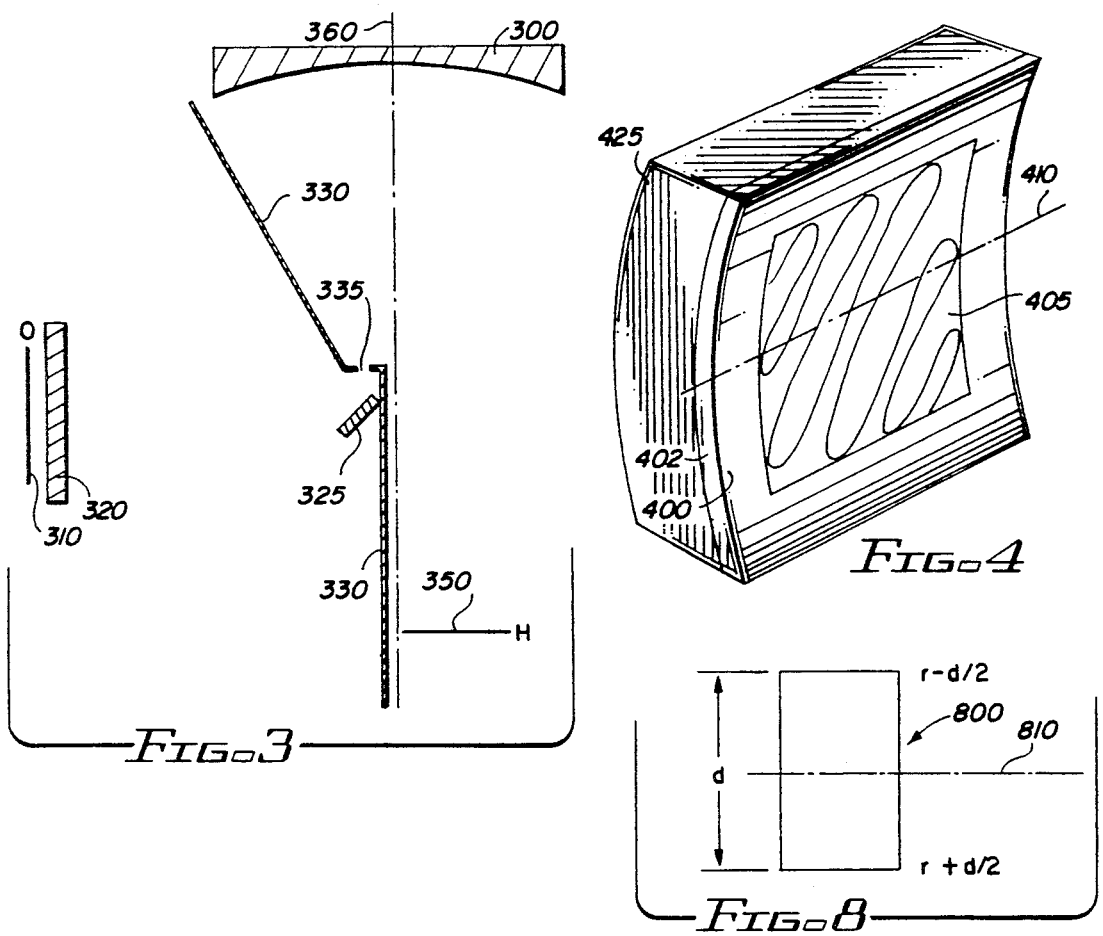
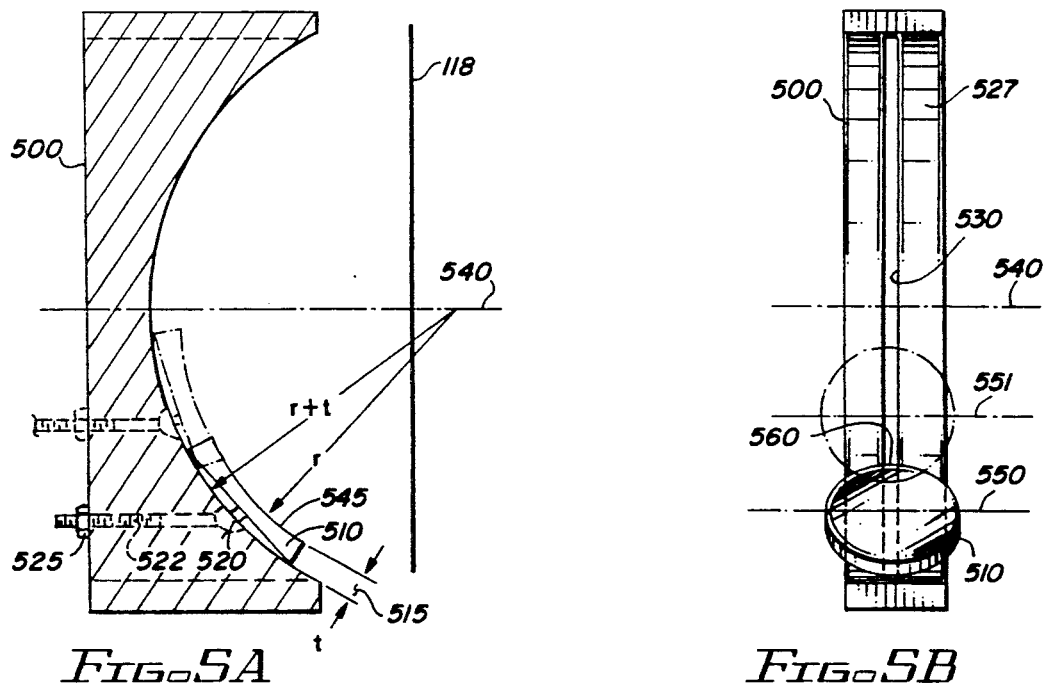

ONE STEP RAINBOW HOLOGRAPHY

This is a division of application Ser. No. 07/122,360, filed Nov. 18, 1987, now U.S. Pat. No. 4,925,260.

BACKGROUND OF THE INVENTION

1. Field of the Invention

This invention relates to the field of optical holography and more specifically to improved apparatus and methods of making one-step rainbow holograms.

2. Discussion of Related Art

Rainbow or Benton-type holograms are incoherent light viewable holograms that retain parallax on one axis only, generally the horizontal. Such holograms are described briefly in Benton, S., "Hologram Reconstruction with Extended Incoherent Sources," *J. opt. Soc. Am.* 59,1545A (1969). A more detailed description can be found in an article by Emmett Leith entitled "Whitelight Holograms," *Sci. Am.* 235,80 (1976).

In the prior art, rainbow holograms are commercially made in a two-step process. In the first step a transmission hologram, generally referred to as H1, is made of an object using a standard off-axis reference beam configuration. After processing, this hologram is then illuminated though a narrow horizontal slit by the conjugate of the reference beam used in making H1 so as to reconstruct the pseudoscopic real image of the object from the perspective of the slit. A second hologram, generally referred to as H2, is then made by interposing a recording medium within the plane of this real image reconstruction and bringing in a second reference wave to interfere with the object wave at the recording plane. The resulting hologram reconstructs not only an orthoscopic image of the object but also a real image of the horizontal slit (exit slit) positioned in front of the hologram. When the hologram is illuminated by white light and a viewer is positioned at the exit slit, the viewer will see the entire image of the object in a single hue from the single vertical perspective of the horizontal slit. This hue changes as the viewer changes viewpoint vertically at the exit slit—thus the term 'rainbow' hologram.

A drawback of the two-step process is that it requires two completely separate and costly holographic systems to yield the H2 rainbow hologram. Furthermore, the quality of the H2 hologram in the two-step process can be degraded by the limited resolution of the photosensitive medium used to record H1, and its subsequent photographic processing.

In attempts to develop simpler, lower cost alternatives to two-step rainbow holography, several investigators have proposed direct one-step methods. Chen and Yu in an article entitled "One-step Rainbow Hologram," *Opt. Lett. Opt.* 2,85 (1978) proposed a simple setup with a slit and a single imaging lens that yields an orthoscopic image with the real slit image in the proper position. The horizontal (or holographic) field of view is limited by the size of the imaging lens. Similar optical systems are used in U.S. Pat. No. 4,235,505 and in Chen, et.al. "Generation of Color Images with One-step Rainbow Holograms," *Appl. Opt.* 17,1490 (1978). One deficiency of one-step lens based systems is the implicitly large and costly imaging lens that would be required to yield a field of view consistent with that of commercial two-step rainbow holograms. A second drawback is the image aberrations that are introduced by the lenses.

A one-step method using a concave mirror has been proposed by Hariharan, et. al., in an article entitled "One-step Multicolor Rainbow Holograms with a Wide Angle of View," *Optica Acta* 26,289 (1979). The apparatus employed a large diameter concave imaging mirror of large numerical aperture. The object and recording plane were located in line and off-axis at the center of curvature of the mirror, with the slit located between the center of curvature and the focal point. This configuration gives unit magnification, orthoscopic viewing, and proper positioning of the real image of the slit. However, the single mirror does not retain correct left-to-right orientation in the holographic image.

As with lens-only systems, the concave mirror used by Hariharan also introduces image aberrations which even for the large diameter/high numerical aperture mirror chosen, could be of practical significance even for relatively small sized objects. For example, for the mirror chosen, image curvature could be objectionable in critical applications for objects as small as five inches in diameter. Furthermore, by employing off-axis imaging the image sag due to curvature is at least four times as great as with on-axis imaging. As regards field of view, even with the sizeable and fast mirror used by Hariharan, the field of view was only 66 degrees; this does not compare favorably with the 100–120 degree field of view exhibited by the majority of commercial rainbow holograms. Additionally, in-line off-axis imaging makes it difficult if not impossible to uniformly light an object with multiple object beams as is required for high quality rainbow hologram imagery.

In order to be competitive with conventional two-step rainbow holograms, a one-step hologram must have a holographic field of view comparable to two-step holograms. While the field of view in two-step rainbow holography can be increased with little additional system cost and with no effect upon image aberrations, a similar increase for the one-step processes reported in the prior art would necessitate massive, costly optics if image aberrations were to be kept at a minimum. This would obviate against choice of prior art one-step methods.

There is no method in the prior art for choosing the parametric values of the optical system in one-step rainbow holography for a level of acceptable aberrations, image size, and holographic field of view. The present invention satisfies this need.

The ability to vary the magnification of a holographic image in rainbow holography is of interest since it eliminates the necessity for exact one-to-one models. Of particular importance is image reduction since a large, highly detailed model can be made and then holographically reduced to the desired image size. To change magnification in the two-step process requires a large lens located relative to the H1 real image reconstruction. Aside from cost considerations, the lens would introduce aberrations and would need to have a diameter greater than the length of H1 so as not to reduce field of view. In eliminating these difficulties, the one-step apparatus of the present invention makes magnification changes straightforward and requires no additional optical elements. For reduction of the size of the image, the one-step apparatus of the present invention actually increases the holographic field of view. As another benefit, the present invention allows the reduction of conventional H1 holographic images by using the one-step apparatus as the second stage of the conventional two-step process.

One of the primary commercial uses of two-step rainbow holography is in preparation of masters in photoresist for subsequent metallizing for mass hologram replication. Especially for small images such as those used in security applications, direct recording in photoresist in one-step would considerably reduce equipment cost and time requirements. There has been no report of a one-step process for making a rainbow master directly into photoresist, presumably since the required field of view and image quality constraints were not met by the one-step prior art. The present invention satisfies this need.

SUMMARY OF THE INVENTION

The invention provides improvements in one-step rainbow holography that yield wide holographic field of view and reduced image aberrations, methods of specifying certain optical parameters in one-step rainbow holography, and methods of varying the image size in the resultant holograms. Importantly, the invention makes possible one-step rainbow holograms recorded directly into a photoresist medium for subsequent mass hologram replication.

Several embodiments of the invention are shown. The first embodiment is comprised of an on-axis one-step apparatus for making rainbow holograms of real objects utilizing a spherical concave mirror and beamsplitter optics. The on-axis configuration considerably reduces image curvature as compared to off-axis configurations. Optics are employed in the first embodiment to further reduce image aberrations. These allow short radius of curvature mirrors of large numerical aperture to be employed without resulting in undesirable image aberrations.

A second embodiment of the invention is comprised of an on-axis one-step apparatus for making rainbow holograms with reduced image size from a reconstructed holographic real image. The embodiment includes optics that reduce aberration in the rainbow hologram while conserving laser light required in the recording process. Both the first and second embodiments maintain correct left-to-right image orientation.

A third embodiment of the invention is comprised of an off-axis one-step apparatus that maintains correct left-to-right image orientation. By suitable use of optical components detailed in the first and second embodiments, the third embodiment of the invention is applicable to either real objects or reconstructed holographic real images as objects.

Choice of embodiments one and two over embodiment three would be dictated when high laser power is available while system optical budget is relatively low. Embodiment three would be preferred over embodiments one and two when laser power available is limited while system optical component budget is relatively high.

A fourth embodiment of the invention is comprised of a curved holographic recording device whose curvature is designed to counteract image curvature in the one-step optical system. This device can be employed with each of the first three embodiments.

A fifth embodiment of the invention is comprised of a scanning concave mirror of small diameter, the purpose of which is to obtain a wide field of view when employed in the first three embodiments. Under this embodiment, wide field of view is obtained by multiplexing several identical holographic images from separate fixed positions of the scanning mirror.

A sixth embodiment is comprised of a segmented mirror system consisting of a number of small diameter concave mirrors of the required radius of curvature. The segmented mirror, applicable to the first three embodiments yields a wide effective field of view at considerably lower cost that a single, large diameter concave mirror.

Several methods are given under the invention to enhance the practice of one-step rainbow holography. A first method describes the manner in which a one-step rainbow hologram of reduced image size is made from a full size object. A second method describes the manner in which a one-step rainbow hologram of reduced image size is made from a reconstructed real image from a laser transmission hologram. Both of these methods have additional benefit in reducing image aberrations and increasing the holographic field of view in the resulting hologram.

Finally, a method is given for specifying the radius of curvature and minimum effective aperture of the concave mirror system in one-step rainbow holography so as to maintain image aberration at acceptable levels and yield the desired field of view.

These and other features and advantages of the present invention will be best understood from the following detailed description when read in conjunction with the accompanying drawings.

BRIEF DESCRIPTION OF THE DRAWINGS

FIG. 3 is a plan view of a partial off-axis apparatus illustrating the object and recording planes under unit magnification imaging conditions.

FIG. 4 is a fragmentary perspective view of a curved holographic recording device to reduce image curvature in accordance with the invention.

FIG. 5A is a side elevation sectional view of a scanning mirror apparatus to increase the holographic field of view.

FIG. 5B is a front elevation view of the apparatus of FIG. 5A.

FIG. 8 is a top sectional view of a holographic image plane centered equally about the center of curvature of a concave mirror.

DESCRIPTION OF THE PREFERRED EMBODIMENTS

Figure 1:
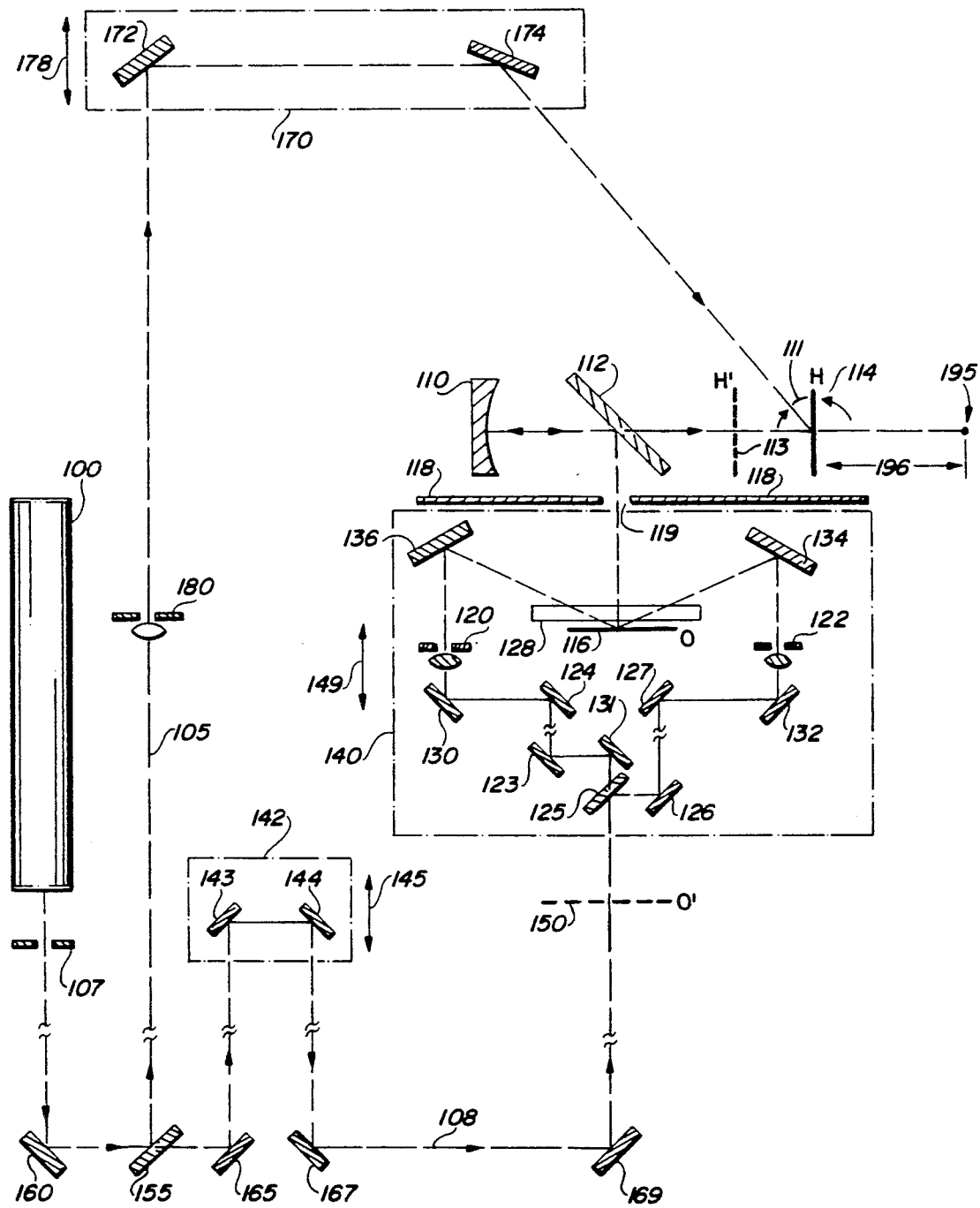
FIG. 1 is a plan view of an on-axis one-step apparatus for rainbow holography of real objects.

FIG. 1 shows a plan view of a one-step holography apparatus for rainbow holography of real objects. Though not shown, the entire apparatus is rigidly mounted on a vibration-damped isolation table. The beam emitted from laser 100, preferably an argon ion laser emitting at 457 nm or lower is deflected by plane mirror 160 and split by variable beamsplitter 155 into two beams, object beam 108 and reference beam 105. The object beam is deflected by plane mirrors 143 and 144 in the directions 145 shown. The path length from plane mirrors 165, 143, 144, and 167 can be varied by positioning structure 142 with respect to mirrors 165 and 167. The purpose of mirrors 165, 143, 144, and 167 and structure 142 is to enable equalization of object and reference beam path lengths.

Beam 108 is deflected by plane mirror 169 and directed to structural assembly 140. Structural assembly 140 has translatable means to enable movement in the directions 149 shown. Beam 108 is split by a 50%-50% beamsplitter 125 into two object beam paths. The first path is comprised of plane mirrors 126, 127, and 132; spatial filter 122, consisting of microscope objective and pinhole assembly; and large plane mirror 134. The expanded and filtered beam from 122 is deflected by 134 and illuminates the object plane 116 after passing through cylindrical corrector lens 128. The second object beam path is comprised of plane mirrors 131, 123, 124, and 130, spatial filter 120, and large plane mirror 136. The expanded beam deflected from 136 illuminates the object plane 116 after passing through lens 128. The purpose of the dual object beams is to obtain even illumination at the object plane 116 for high quality holographic imaging. To minimize hologram demodulation, path lengths (125-131-123-124-130-136-116) and (125-126-127-132-134-116) are equal.

At the object plane 116 is located either a two or three dimensional real object of which a rainbow hologram is to be made. The object may be considered for purposes of this discussion to have four reference points, namely, top and bottom and left and right. The dimension in the direction top to bottom is designated as the length of the object. The dimension along the left to right direction is designated as the width of the object. Depending on the type of object, the length can be either larger or smaller than the width. In FIG. 1 the length of the object is parallel to the plane of the paper.

Light reflected from the object at object plane 116 passes through cylindrical corrector lens 128 and slit assembly 118. In FIG. 1 the slit with aperture 119 is oriented perpendicular to the plane of the paper and has an opening with width of the order of 3-5 mm. Light passing through 118 is deflected by large plane 50%-50% beamsplitter 112 oriented at 45 degrees as shown in FIG. 1. The thickness of 112 is preferably of the order of 1-2 mm. Beamsplitter 112 is preferably anti-reflection coated on the side facing 114 for the laser line used (i.e. 457 nm).

Light reflected from beamsplitter 112 travels to concave spherical mirror 110. Due to the limiting stop of the slit 118, concave mirror 110 need be only a fraction as wide as it is high. For example, in FIG. 1 if the diameter of mirror 110 is taken at 20 inches, then the mirror need be only as wide as the width of the maximum size object that is to be accommodated (or slightly larger). This is advantageous as it allows room for plane mirrors 134 and 136, especially when concave mirror 110 has a short radius of curvature.

For the sake of discussion, with a mirror diameter of 20 inches (a mirror height 20" perpendicular to the plane of the paper), the slit structure 118 need be at least 20 inches high, and of sufficient extent to block stray reflections. Similarly, beamsplitter 112 need also have a vertical height of at least 20 inches. To eliminate potential vibration problems, the beamsplitter should be rigidly mounted.

Light reflected from concave mirror 110 passes through beamsplitter 112 and illuminates the holographic recording plane 114. The image at 114 of the object at 116 is real, orthoscopic, and inverted.

In FIG. 1 the locations of the object plane 116 and recording plane 114 are shown at the center of curvature of concave mirror 110. In this position the system will operate at unit magnification. Advantageously, since there is an even number of reflections made by the object wave traversing from 116 to 114, the image will have proper left-to-right orientation.

Slit 118 is physically located between the focal point and center of curvature of concave mirror 110. Placement is made such that a real image of the slit, indicated by 195 in FIG. 1 will be projected at a comfortable viewing distance 196 from 114. The image S at 195 will be of larger width and length than the real slit 118 and will extend in a plane perpendicular to the plane of the figure.

Concave mirror 110 introduces aberrations into the one-step process, the most important of which are image curvature, astigmatic blur, and lateral magnification distortion. Of these, image curvature is the most noticeable in the rainbow hologram application. As one advantage of the on-axis imaging in FIG. 1, the sag due to image curvature and the blur due to astigmatism, assuming equal radii mirrors and equal slit widths, are less than one-fourth as large as for an off-axis imaging system. However, curvature exists for the on-axis case even for long radii mirrors. The curvature, nonetheless, can be reduced to zero if desired. Lens 128 in FIG. 1 is a negative concave cylindrical lens with axis perpendicular to the length of the slit and power in the direction of slit length. For example, if lens 128 is plano-concave then to reduce image curvature to zero along the length of the object, the radius of curvature r' of the curved face of lens 128 is given by $$r' = [r(n-1)]/2n \qquad (1)$$

where r is the radius of curvature of the mirror 110 and n is the index of refraction of lens 128. If the lens 128 is equi-concave, then r' is twice the value as in the plano-concave case. In either instance, the lens is preferably acrylic or glass, or alternatively can be a liquid-filled optic. To eliminate astigmatism caused by the cylindrical lens, lens 128 should be located as close to the object plane 116 as possible. The lens should be sufficiently wider than the narrow dimension of the object at 116 so that the full width of the object is illuminated by object beams reflected by plane mirrors 134 and 136. To reduce reflections, both surfaces of lens 128 should be AR coated for the laser line used. It should be noted that image curvature in the direction parallel to the width of the slit is much less than in a direction parallel to the slit length and, practically speaking, need not be corrected.

An alternative or supplementary device to reduce image curvature is shown in fragmentary perspective view in FIG. 4. For unit magnification, curved holder 425 in FIG. 4 is located, by reference to FIG. 1, at the hologram recording plane 114. Cylindrical lens 128 in FIG. 1, if only partially correcting image curvature, can remain in the system. Alternatively, lens 128 can be removed. Holder 425 in FIG. 4 is curved along an axis perpendicular to the length of slit 118 in FIG. 1. Holder 425 has recording surface 400 with image resulting from mirror 110 indicated by 405. The recording surface is preferably a photoresist material such as Shipley Company AZ 1470 coated on a flexible film substrate indicated as 402 in FIG. 4; said substrate is temporarily affixed to holder 425 by vacuum or adhesive means.

The concave surface of mirror 110 in FIG. 1 and holder 425 in FIG. 4 oppose each other. To reduce image curvature appreciably, the radius of curvature of the recording surface 400 should be less than one-half the radius of curvature of spherical mirror 110. Since the final hologram will be viewed flat, pre-distorting the recording medium partially compensates for image curvature introduced by the upstream concave mirror 110. Further, for a given depth object at the object plane 116 in FIG. 1, curved recording reduces the distortion caused by changes in lateral magnification over the depth of the image.

While not shown in the figures, image curvature can also be compensated by curvature of the object at the object plane 116. In general this approach is not appropriate for three dimensional objects but is quite appropriate for two dimensional art work. For example, in some 2D-3D rainbow holograms it might be desirable to have image distortion in the three dimensional imagery while not in the two-dimensional art work. In this case a concave mirror 110 that introduces significant curvature would be employed for both the two and three dimensional imagery. Prior to recording the two dimensional imagery, however, the two dimensional art work would be curved on an axis perpendicular to that in which compensation is to be afforded. The amount of curvature required could be determined by visual observation at the recording plane 114. To simultaneously correct for curvature on both axes, the two dimensional art work can be photographically recorded on a spherical concave surface of appropriate radius.

Reference beam 105 in FIG. 1 will now be discussed. Spatial filter 180 consisting of microscope objective and pinhole assembly expands the raw laser beam reflected from beamsplitter 155. Assembly 170 with translatable means to allow movement in the directions indicated by the arrows 178 consists of plane mirrors 172 and 174. The expanded reference beam is deflected by mirrors 172 and 174 and impinges on the holographic recording plane at 114 as shown in FIG. 1. To minimize interference fringes caused by spurious reflections, the angle 111 of the reference beam with 114 is preferably chosen at Brewster angle.

As was described earlier, the object located at 116 is oriented such that its length is parallel to the plane of the figure. Thus the object's length is perpendicular to the slit. A hologram recorded at location 114 and viewed in transmission will reconstruct an orthoscopic image and the slit image in the viewer's space when the white light reconstruction beam is perpendicular to the width of the object and at the angle 111 that the original reference beam made with holographic recording plane 114. On the other hand, when the hologram is viewed in reflection, the reconstructin beam must be a mirror reflection of angle 111 in order to reconstruct an orthoscopic image and the slit image in the viewer's space.

The apparatus in FIG. 1 makes possible a reduced holographic image from a larger object. By locating an object beyond the center of curvature of 110, say at 150 in FIG. 1, a reduced image of the object will be projected at location 113 between the focal point and the center of curvature of the concave mirror.

Advantageously, by optically reducing the image (operating at a magnification less than one) both astigmatism in the image and image blur due to astigmatism are reduced compared to the unit magnification case.

Further, the difference in lateral magnification from the back to the front of the image of an object of given depth located beyond the center of curvature will be less than the lateral magnification difference of an object of depth d located at or within the center of curvature of the mirror. Thus by using an enlarged object and reducing it optically, distortion resulting from the difference in front to back magnification is reduced compared to same size or enlarged images. On the other hand, since the depth magnification is equal to the square of the lateral magnification, optical reduction will introduce depth compression in the image; this compression is of little consequence in most display holography applications.

One additional advantage of optical reduction is an increase in holographic viewing angle. For example, for a mirror with radius of curvature 20 inches which has a field of view of 60 degrees for unit magnification, the field of view when the image position corresponds to a magnification of 0.5 is increased to 84 degrees.

The method of obtaining a reduced size holographic image from a fixed size object is illustrated with reference to FIG. 1. Assembly 140 is translated until object plane 116 is located at 150, corresponding to the desired magnification. Holographic recording plane 114 is moved to 113 corresponding to the reduced image location at the desired magnification. In order to maintain the same reference beam angle 111, which is desired, assembly 170 is translated downward until the holographic recording plane at location 113 is properly illuminated. Both object and reference beam path lengths are then equalized by appropriate movement of assembly 142. As a consequence of re-locating assembly 170, any adjustment in beam ratio is easily accomplished with variable beamsplitter 155. While not shown in FIG. 1, scales could be provided for assemblies 140, 142, and 170 to obtain the proper settings for any desired image size reduction.

Once the apparatus is adjusted for the desired magnification, a photoresist recording medium is positioned in a holder at the desired recording plane. The holder can be a conventional film holder, a conventional plate holder, or a curved holder as shown in FIG. 4. The medium is exposed by opening shutter 107 for the required exposure time. The medium is then removed from the holder and processed. The resulting master rainbow hologram is a phase relief hologram. By well known art, this master hologram can then be metallized, and electroplated replica shims made for mass production embossing or molding into appropriate substrates.

Figure 2:
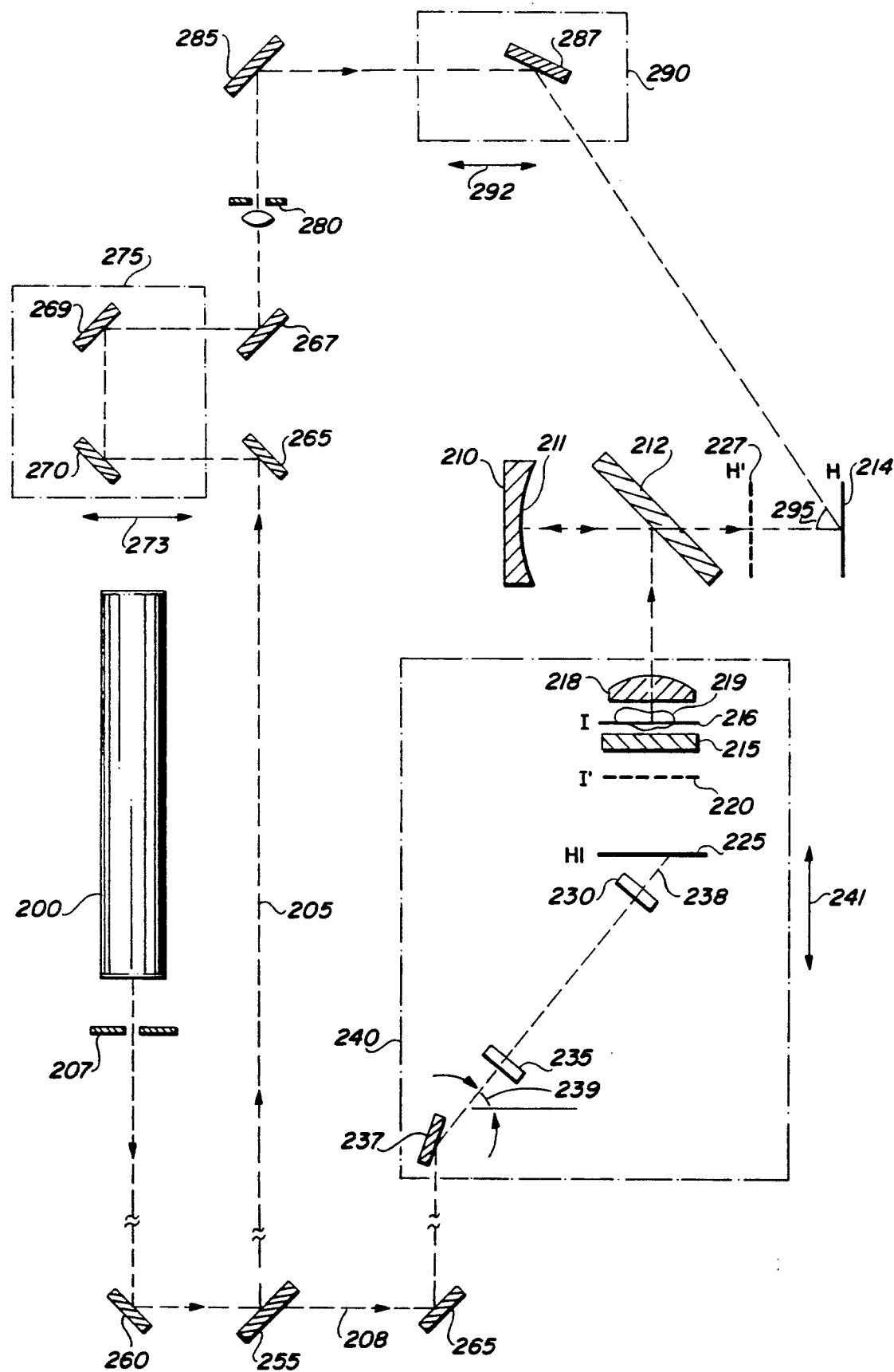
FIG. 2 is a plan view of an on-axis one-step apparatus for making a reduced image size rainbow hologram from a reconstructed holographic real image.

FIG. 2 shows a plan view of a second on-axis apparatus intended for making reduced size rainbow holograms from the reconstructed images of laser transmission H1 holograms. The apparatus has application for reducing the holographic images in H1 integral and pulsed laser transmission masters. Additionally, H1 images made from rare or costly objects can be reduced without requiring the original object to be re-holographed. The primary advantage of the one-step apparatus in FIG. 2 is the ease in varying image magnification and the increase in field of view that obtains.

Similar to FIG. 1, beamsplitter 255 divides the laser beam emitted from laser 200 into two beams, object beam 208 and reference beam 205. Object beam 208 is deflected by plane mirror 265 to enter structural assembly 240 with translatable means to enable movement in directions 241 shown. Reflected from plane mirror 237, the raw beam is expanded and collimated by a cylindrical collimator consisting of lenses 235 and 230. Both lenses have axes parallel to the paper with power extending perpendicular to the plane of the paper. This results in hologram H1 (225) being illuminated by a thin collimated vertical beam.

Hologram 225 is a previously made and processed laser transmission hologram made with a collimated reference beam conjugate to beam 238. The hologram is positioned such that conjugate reconstruction beam 238 reconstructs a real image 219 of the original holographed information at location 216. Image 219 is real and pseudoscopic with its length parallel to the plane of the paper.

Concave mirror 210 and 50%–50% beamsplitter 212 are positioned as shown in FIG. 2. These optics have the same properties as elements 110 and 112 in FIG. 1. Thus if both 216 and 214 in FIG. 2 are located at the center of curvature of 210, a real, inverted, pseudoscopic, unit magnification image of 219 will be located at 214.

Cylindrical lenses 215 and 218, both larger than image 219, are used to obtain a slit image perpendicular to the plane of the paper at the surface 211 of concave mirror 210. Cylindrical lens 215 is a weak negative lens which increases the length of the slit image on the concave mirror. For master H1 holograms with narrow holographic viewing angles, lens 215 will thereby increase the holographic field of view in the resulting rainbow hologram.

Cylindrical lens 218 is a weak positive lens with axis orthogonal to 215. Lens 218 controls the width of the slit on the concave mirror 210. Since both lenses 215 and 218 are weak and located directly in the plane 216 of image 219, the image formed by mirror 210 will not be distorted. The optical elements 235, 230, 215, and 218 utilize most of the light from the raw object beam 208 to form the image and will tend to compensate for the loss due to the beamsplitter 212. Additionally, lens 215 reduces image curvature at 214 due to mirror 210.

As an alternate configuration, lenses 215 and 218 could be eliminated and a physical slit (not shown in the drawings) oriented perpendicular to the plane of the paper could be located at the mirror surface 211. While this would serve essentially the same purpose as lenses 215 and 218, it would waste light.

The reference beam 205 has beam path length equalization assembly 275 consisting of plane mirrors 270 and 269, and steering mirrors 265 and 267. Spatial filter 280, consisting of microscope objective and pinhole assembly, expands and filters the raw reference beam. Plane mirror 285 and assembly 290 consisting of mirror 287 direct the expanded beam to the holographic recording plane 214.

The method of image reduction is effected by translating assembly 240 until 216 is located at 220, beyond the center of curvature of 210, corresponding to the object position that yields the desired magnification. Hologram recording plane 214 is then moved to position 227, corresponding to the image position at the desired magnification. Assembly 290 is translated so as to illuminate the holographic recording plane at 227 without angle change. Finally, assembly 275 is translated to obtain equal object and reference beam path lengths. A hologram on preferably a photoresist medium is then made as described previously.

The resulting hologram, if illuminated with a white light reconstruction beam incident on the hologram at angle 295 as in FIG. 2, will reconstruct a pseudoscopic, reduced size, inverted image of 219 with proper left-to-right orientation, together with a virtual image of the slit. Both pseudoscopy and a virtual slit are unacceptable conditions for viewing the rainbow hologram. However, if instead the resulting hologram is illuminated with a conjugate white light reconstruction beam, the image will be orthoscopic and a real slit image will reconstruct in the viewer's space, which are the desired conditions.

Compared to an off-axis mirror system, both of the on-axis systems in FIG. 1 and FIG. 2 substantially reduce image curvature and astigmatic blur. The tradeoff is the light loss by beamsplitter 112 or 212 which obviates against the use of a low power laser to expose the required photoresist recording medium. In other words, the tradeoff is aberration reduction versus required laser power.

FIG. 3 shows a plan view of a partial off-axis one-step rainbow holography apparatus that maintains proper left-to-right image orientation. For simplicity in the presentation, the object beam path upstream of 310, and the reference beam path are not shown. Those familiar with the holographic art will realize that paths similar to those in FIGS. 1 and 2 are required to complete the apparatus.

For unit magnification, object plane 310 and recording plane 350 are each located at the center of curvature of concave spherical mirror 300. Clearly, both object and recording planes 310 and 350 are located off the axis 360 of the concave mirror 300. Slit structure 330 has slit aperture 335 located between the focal point and center of curvature of 300. The slit aperture is oriented with its length perpendicular to the plane of the paper. Plane mirror 325 is narrow in the plane of the paper and positioned with its long dimension orthogonal to its width. Taken together, mirrors 300 and 325 provide the even number of reflections required for correct left to right image orientation.

Lens 320 is a negative cylindrical corrector lens identical to lens 128 in FIG. 1. Lens 320 is appropriate when a real object is located at object plane 310. As in the discussion accompanying FIG. 1, curved recording holder 425 in FIG. 4 can be employed for aberration reduction by locating said holder at holographic recording plane 350 in FIG. 3. As with the on-axis apparatuses in FIGS. 1 and 2, the apparatus in FIG. 3 may be used similarly to obtain reduced image size rainbow holograms.

With modification, the off-axis apparatus in FIG. 3 can be employed for making a rainbow hologram with a reduced size image from a H1 laser transmission hologram. In this instance lens 320 in FIG. 3 is replaced by FIG. 2 component lenses 235 and 230, and hologram H1 (225) and lenses 215 and 218 are positioned as shown in FIG. 2.

In cases where laser power is critical and small objects with little depth are to be holographed, the off-axis apparatus in FIG. 3 presents a viable alternative to the on-axis apparatuses in FIGS. 1 and 2.

In the discussion of the FIGS. 1, 2, and 3, a concave spherical mirror (110, 210, and 300) was shown. Such a concave spherical mirror can be replaced with a plano-convex lens or a bi-convex lens in such a way that the rear side is coated with a reflecting metallic layer such as of aluminum. For the case of a plano-convex lens in which the curved side is reflecting and the plane side is transmitting, let the radius of curvature of the spherical side of the lens be $r_{pc}$ and the refractive index of the lens material be n. Then the effective radius of curvature of such a plano-convex lens used in place of a concave mirror can be approximated by $$r \approx r_{pc}/n \quad (2)$$

where the thickness of the lens is small compared to the radius of curvature of the lens surface. Taking n=1.5, we have $$r \approx \frac{2}{3} r_{PC}.$$

The advantage of using a plano-convex lens as an equivalent concave spherical mirror is that one can use a longer radius of curvature to obtain an effective shorter radius of curvature for the equivalent concave spherical mirror.

In the case of a bi-convex lens in which one surface is reflecting and the second surface is transmitting, and the radius of curvature of both surfaces is the same and represented by $r_{bc}$, the effective radius r of the equivalent concave mirror is given by:

$$r \approx r_{bc}/(2n-1) \quad (3)$$

where the thickness of the lens is small compared to the radius $r_{bc}$. As before, for n=1.5, we have $r \approx r_{bc}/2$.

The above discussion regarding the use of plano-convex and bi-convex lenses in place of a conventional concave mirror in one-step rainbow holography applies in all cases where a single mirror is used as the imaging element.

In order for concave spherical mirrors 110, 210, and 300 in FIGS. 1, 2, and 3, respectively, or their lens counterparts with single metallized surface to be capable of a large field of view in a plane parallel to the length of the slit, said mirrors must have large numerical aperture. For appreciable mirror radius of curvature, say 20 inches, and for unit magnification imaging, a mirror diameter in excess of 30 inches would be required to obtain a 100 degree holographic field of view. To obviate against employing such costly large diameter mirrors, FIG. 5 and FIG. 6 show two apparatuses for obtaining a large effective aperture with small diameter mirrors.

FIGS. 5A and 5B show a side elevation and front elevation sectional views, respectively, of a mirror support apparatus 500 to rigidly locate a small diameter concave mirror 510 of radius of curvature r. Mirror 510 has thickness t (515). At the rear of mirror 510 is rigidly affixed a ball and socket (520) and threaded rod 522. Support 500 has a curved face 527 of radius equal to r+t. As shown in FIG. 5B, a slot 530 is provided to retain threaded rod 522. Thus mirror 510 can be variously positioned along surface 527 and rigidly fixed in a desired position by action of retaining nut 525.

The method of obtaining a wide field of view utilizing the apparatus illustrated in FIGS. 5A and 5B will be described with reference to FIG. 1. In FIG. 1, concave mirror 110 is replaced with apparatus 500 oriented in such a manner that slot 530 is parallel to slit length 118 and mirror 510 faces beamsplitter 112. As with mirror 110, mirror 510 need not be wide in a plane parallel to the paper.

The method consists of making several multiplexed holographic exposures on a photoresist medium located at the recording plane. The first exposure is made with mirror 510 located at the lower end of the slot (position 550) as shown in FIG. 5B. Mirror 510 is then moved to a new position 551, with mirror 510 slightly overlapping its former position at 560, and a second exposure is made. Mirror 510 is successively moved along the slot 530 and additional exposures made until the desired field of view is covered. By way of example for unit magnification imaging, if mirror 510 has a radius of curvature of 20 inches and a diameter of 8 inches, the field of view for the mirror alone is 23 degrees. If the mirror were made to assume four slightly overlapping positions in apparatus 500 with four holographic exposures made, the corresponding holographic field of view would be increased to 92 degrees. The tradeoff with using this method is mirror cost versus reduction in diffraction efficiency due to holographic multiplexing.

Figure 6A:
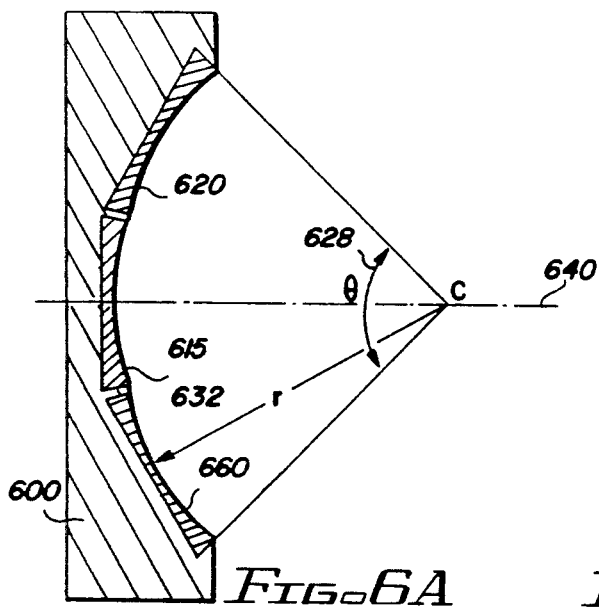
FIG. 6A is a side elevation sectional view of a second apparatus to increase the holographic field of view utilizing segmented mirrors.
Figure 6B:
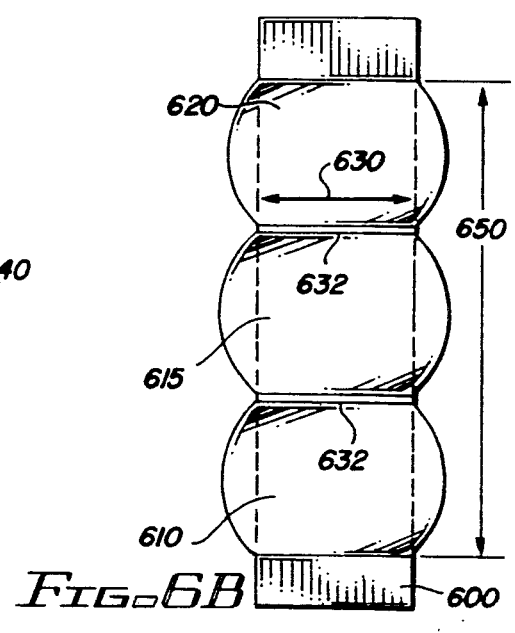
FIG. 6B is a front elevation view of the apparatus in FIG. 6A.

A second apparatus to obtain a wide field of view with small mirrors is shown in FIGS. 6A and 6B. In FIG. 6A support 600 holds, by way of illustration, three small diameter concave mirrors 610, 615, and 620. The field of view for unit magnification imaging is defined in FIG. 6A by the angle $\theta$ (628). Clearly, to increase $\theta$ for a given radius of curvature, more mirrors are required. Each mirror in FIGS. 6A and 6B has the same radius of curvature r and is cut as shown in FIG. 6B such that plane and parallel edges 632 obtain. Mirrors 610, 615, and 620 are abutted together with as little gap as possible. In practice, structure 6A can replace unit concave mirrors 110, 210, and 300 in FIGS. 1, 2, and 3. In FIG. 1 for example, structure 600 in FIG. 6B is oriented with the long segmented mirror dimension 650 parallel to the long dimension of slit 118. Since mirror aperture 630 in FIG. 6B is parallel to slit 118's width, it need only be wide enough to collect the marginal rays from the extreme ends of an object at 116 in FIG. 1 as passed by the slit. The tradeoff with this method is unit mirror cost versus image discontinuity at each junction 632 of the small mirrors.

A method will now be described for choosing the radius of curvature and minimum aperture of a concave mirror or its equivalent in the one-step process. This method will insure that a holographic image of an object of depth d that can fit within a square frame of side L will reconstruct at unit magnification without objectionable aberration, said hologram having the required field of view. This method is based on arriving at acceptable levels of those concave mirror aberrations that have importance in one-step rainbow holography. These are 1) image curvature, 2) astigmatic blur, and 3) depth distortion. Other aberrations such as spherical aberration are not as important since the pupil size of the observer in the final viewing of the hologram is very small and hence at any time only a narrow bundle of rays enters the eye.

Figure 7:
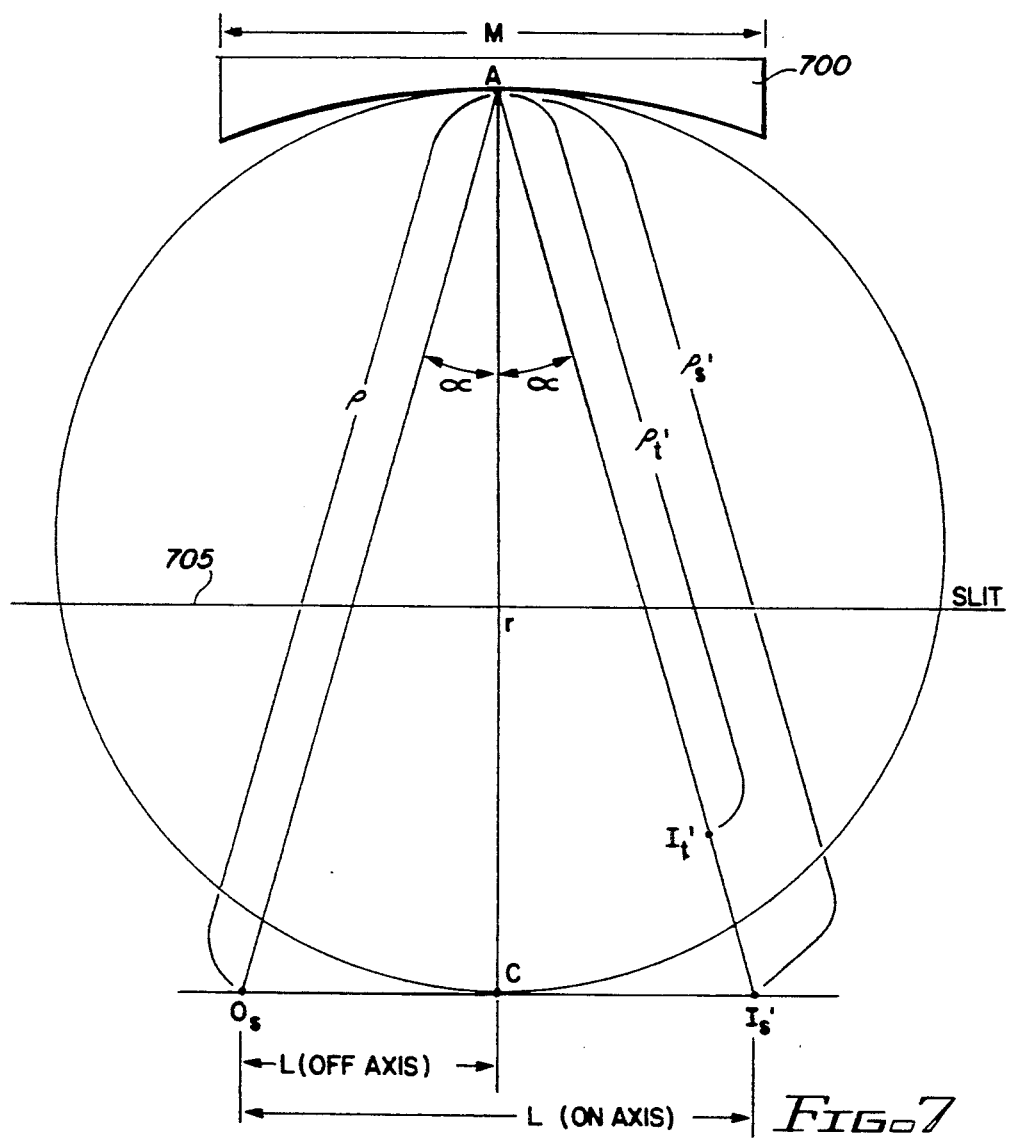
FIG. 7 is a side sectional view of a spherical concave mirror with image aberration parameters illustrated.

FIG. 7 shows a side sectional view of a spherical concave mirror 700 of radius r and center of curvature C. The mirror is oriented such that the width M of the section is parallel to the long dimension of slit 705 in FIG. 7 and slit 335 in FIG. 3. For purposes of this discussion, the object is located in such a way that it lies in a plane perpendicular to line AC in FIG. 7, with end points $O_s$ and C. Thus the end points of the object are in the off-axis situation illustrated in FIG. 3.

The rays admitted by the slit along its length are tangential rays and those admitted perpendicular to its length are saggital rays. If $O_s$ is the object end point, the saggital rays focus at $I_s'$, and the tangential rays focus at $I_t'$. The angle $\alpha$ determines the size parameters in relation to the radius r of the mirror.

With reference to the parameters in FIG. 7, since slit 705 is long, $P_t'$ represents the actual distance at which the image of $O_s$ is formed ($I_t'$). $P_s'$ represents the distance at which the narrow bundle of rays perpendicular to the slit are imaged at $I_s'$. Thus the quantity $(P_s' - P_t')$ represents both the sag due to curvature of the visual image and the longitudinal astigmatism and is given by $$(P_s - P_t) = \frac{2r\sin\alpha\tan\alpha}{1 + \sin^2\alpha} \quad (4)$$

The effect of astigmatism can be expressed as blur at $I_t'$. Assuming W as the width of the slit effective on the mirror surface, blur, B, can be expressed as $$B = \left(\frac{2\sin^2\alpha}{1 + \sin^2\alpha}\right) \cdot W \quad (5)$$

For the off-axis imaging situation and for $\alpha$ small, noting that $L/r \approx \alpha \approx \sin\alpha \approx \tan\alpha$, equations 4 and 5 can be expressed for off-axis imaging as $$(P_s - P_t) \approx \frac{2L^2}{r} \quad (6)$$

$$B \approx \frac{2L^2 W}{r^2} \quad (7)$$

For on-axis imaging such as in FIG. 1 and 2, the object length L in equations 6 and 7 should be taken as one-half the off-axis length since the object is symmetrical around C. Thus the approximate formulas for image curvature and astigmatic blur for on-axis imaging are given by:

$$(P_s - P_t) \approx L^2/2r \quad (8)$$
$$B \approx L^2 W/2r^2 \quad (9)$$

For the same conditions (i.e., r and W being the same) the on-axis apparatuses of FIGS. 1 and 2 will have one-fourth of the sag due to image curvature and astigmatic blur compared to the off-axis situation in FIG. 3 for the same size object. In actual practice this may be even one-fifth to one-sixth because the object cannot be placed exactly touching the center of curvature C.

For purposes of illustrating the criterion method, on-axis approximations will be used, although it should be clear that the exact formulas could be employed. Thus for the on-axis case, L in FIG. 7 is equal to the distance ($O_s - I_s'$).

The image curvature criterion C for on-axis imaging is by definition the difference $(P_s' - P_t')$ over the half object length $L/2$ $$C_1 \overset{\Delta}{=} \frac{2(P_s - P_t)}{L} \approx \frac{L}{r} \quad (10)$$

The astigmatic blur criterion $C_2$ for on-axis imaging is given by the blur equation 9 directly.

$$C_2 \overset{\Delta}{=} B \approx \frac{L^2 W}{2r^2} \quad (11)$$

The depth distortion criterion will now be developed with reference to FIG. 8. FIG. 8 illustrates a plan view of holographic image space 800 of depth d recorded such that one-half of an image in the space is real and one-half is virtual. For the one-step process at unit magnification, the holographic recording plane 810 is located at the center of curvature of the concave mirror in FIG. 7.

For a given image depth d and radius of curvature r, the difference in lateral magnification between the front of the image and the rear of the image is minimum if the entire image is virtual, maximum if the entire image is real, and between the two if recorded as in FIG. 8. Since FIG. 8 illustrates a desirable condition for a surface relief rainbow hologram viewed in reflection, the depth distortion criterion will be preferably based on the condition shown.

Letting $C_3$ by definition be the difference between the lateral magnification of the front and rear of the image in FIG. 8, $$C_3 = \frac{2rd}{r^2 - d^2} \approx \frac{2d}{r} \quad (12)$$

Briefly, the criterion method depends on first choosing the maximum values of object length and object depth that the system is to accommodate. A one-step apparatus such as illustrated in FIG. 1 is then set up with a concave mirror of fixed radius of curvature r, and a slit which projects an effective width W on the mirror. The system should have no corrector optics and the recording plane should be uncurved. The system should be adjusted to operate at unit magnification since in practice the unit magnification case has higher astigmatism than the case for magnification less than one. The maximum values of criteria $C_1$, $C_2$, and $C_3$ are then determined, based upon visual examination of a series of one-step holograms of objects of various lengths and depths made on the system. After maximum criterion values are determined, the required minimum radius of curvature of an equivalent imaging mirror is determined. Finally, given this minimum radius of curvature, the required mirror dimension in a plane parallel to the object's length dimension is determined for the desired hologram field of view. It should be noted that the visual judgments required by the criterion method depend on the proposed use of the holograms to be made on the system because the dis-utility of image aberrations varies with the intended application. In security applications, for instance, the judgement is preferably made utilizing conventional two-step rainbow holograms as comparison standards. In other display applications a certain amount of obvious distortion may enhance the imagery, (i.e. some commercial and fine art applications), and would therefore be desirable. In such cases, samples of the intended user population should be used in statistically making the judgement.

Thus consider a first series of $n_1$ one-step rainbow holograms made utilizing an on-axis apparatus as illustrated in FIG. 1, each hologram being made of an object of fixed depth with length increasing from hologram to hologram. Let mirror 110 in FIG. 1 have radius of curvature r, and let the width of real image 195 of the slit be fixed for all holograms. The width of 195 is chosen based on a tradeoff between image "graininess" and color "purity" in the rainbow hologram. Generally a real image slit width of the order of 2-4 mm gives an acceptable tradeoff.

After processing, each resulting hologram is visually examined in sequential order and the i-th hologram selected such that the perceived image curvature in the image is acceptable, while the curvature in the (i+1)th image is not. Using Equation 10, the maximum value of $C_1=C_{1max}$ is then computed for the value of $L_i$ corresponding to the object length in the i-th hologram. The value of $C_{2max}$ thus computed is the maximum for all object length and radius of curvature combinations that can be tolerated.

The first series of $n_1$ holograms is next examined for acceptable astigmatic blur. As before, each hologram is visually examined in sequential order and the j-th hologram selected such that the perceived image blur is acceptable, while the blur in the (j+1)st image is not. Using equation 11, the maximum value of $C_2=C_{2max}$ is then computed for the value $L_j$ corresponding to the object length in the j-th hologram.

Next, a second series of $n_2$ one-step holograms is made, where the depth of each object increases sequentially from hologram to hologram. The length of all objects is preferably equal to the maximum length $L_j$ perceived to give acceptable image curvature as determined above.

Each of these $n_2$ holograms is then visually examined and the k-th hologram selected such that the depth distortion is perceived acceptable while that for the (k+1)st hologram is not. Using Equation 12 with the value of $d_k$ found, the maximum value of $C_3=C_{3max}$ is then computed. The value of $C_{3max}$ is the maximum value for all image depth and radius of curvature combinations that can be tolerated.

Now let the desired maximum length and depth of objects that the one-step system is to accommodate by denoted $L_{max}$, and $d_{max}$, and let $\theta_{req}$ be the required field of view of the holograms. Using the value of $C_{1max}$ found above, the minimum radius of curvature for on-axis imaging subject to the $C_3$ criterion is approximately $$r_{c1} \approx \frac{L_{max}}{C_{1max}} \quad (13)$$

Using the value of $C_{2max}$ found above, the minimum radius of curvature subject to the $C_2$ criterion for on-axis imaging is approximately $$r_{c2} \approx \sqrt{\frac{L_{max}^2 W}{2C_{2max}}} \quad (14)$$

Using the value of $C_{3max}$ found above, the minimum radius of curvature subject to the $C_3$ criterion is approximately $$r_{c3} \approx \frac{2d_{max}}{C_{3max}} \quad (15)$$

The minimum radius of curvature of the on-axis one-step rainbow system is thus $$r_{min} = \max\{r_{c1}, r_{c2}, r_{c3}\} \quad (16)$$

The minimum dimension, $M_{min}$ of the mirror in a plane parallel to the slit length is given by $$M_{min} = 2r_{min}\sin\left(\frac{\theta_{req}}{2}\right) \quad (17)$$

Finally, the minimum dimension, $V_{min}$, of the mirror in a plane perpendicular to the slit is given by $$V_{min} \approx L\left(1 + \frac{4l}{r}\right) \quad (18)$$

where l is the distance of the slit behind the focal point of the mirror.

EXAMPLE

Let $L_{max}=3''$; $d_{max}=1.25''$; and $\theta_{reg}=100°$. Assume the test mirror has a radius of curvature of 15'', the slit effective at the mirror surface has a width of 0.15'' and, based on subjective evaluation $L_i=4.5''$, $L_j=5.5''$, and $d_k=3.25''$. Then from equations 10, 11, and 12, $C_{1max}=0.3$, $C_{2max}=0.01$, and $C_{3max}=0.45$. From equations 13, 14, and 15, $r_{c1}=10.0''$, $r_{c2}=8.2''$, and $r_{c3}=5.6''$. From equation 16, $r_{min}=10''$; from equation 17, $M_{min}=15.3''$; and from equation 18 with l=2'', $V_{min}=4.6''$.

Those skilled in the holographic and optical arts should realize that many modifications could be made in the above one-step apparatuses and methods and a number of different embodiments of the invention could be made without departing from the scope thereof.

What is claimed is:

1. In holographic apparatus for making rainbow holograms, which apparatus includes a laser light source, means for splitting light from said source into an object beam and a reference beam and directing said beams along different beam paths, means for illuminating a multi-dimensional object positioned at a predetermined object plane, a slit assembly adjacent said object plane and defining a slit of predetermined length and width for passing light reflected from said object to a beam splitter positioned on the side of said slit assembly remote from said object plane, said beam splitter being oriented at an angle to reflect light passed by said slit to concave mirror means and to pass light reflected from said mirror means along a path to illuminate a holographic recording medium which is positioned to receive said reference beam and said reflected light, the improvement wherein said mirror means comprise:
a relatively small diameter concave mirror; and
support apparatus including means for mounting said mirror in a plurality of distinct positions along an arc with radius of curvature equal to the radius of curvature of said mirror, said arc being oriented in a plane which is parallel to the length of said slit such that holograms may be recorded for each distinct position of said mirror to provide the effect of a hologram developed by the use of a single relatively large diameter concave mirror at the position of said support apparatus.

2. The holographic apparatus of claim 1 wherein said support apparatus comprises a support member having an arcuate surface adjacent said mirror, a threaded rod coupled to the back of said small diameter concave mirror by a ball and socket coupling, and means defining a slot extending along said arcuate surface for determining the different positions of said small concave mirror.

3. The holographic apparatus of claim 2 wherein said slot extends in the plane of said arc, and further including means for selectively mounting said threaded rod at locations along said slot corresponding to said different positions.

4. The holographic apparatus of claim 1 further including a plurality of additional concave mirrors substantially identical to said small diameter concave mirror, and wherein said mounting means include means for mounting said additional mirrors in corresponding ones of said distinct positions other than the distinct position occupied by said small diameter concave mirror such that an individual hologram may be recorded which includes contributions from each of said concave mirrors to produce the effect of a hologram developed by the use of a single relatively large diameter concave mirror at the position of said support apparatus.

5. A rainbow hologram produced by the apparatus of claim 1, which hologram comprises a plurality of multiplexed segments, each sequentially contributing to the overall holographic field of view.

6. In holographic apparatus for making rainbow holograms, which apparatus includes a laser light source, means for splitting light from said source into an object beam and a reference beam and directing said beams along different beam paths, means for illuminating a multi-dimensional object positioned at a predetermined object plane, a slit assembly adjacent said object plane and defining a slit of predetermined length and width for passing light reflected from said object to a beam splitter positioned on the side of said slit assembly remote from said object plane, said beam splitter being oriented at an angle to reflect light passed by said slit to concave mirror means and to pass light reflected from said mirror means along a path to illuminate a holographic recording medium which is positioned to receive said reference beam and said reflected light, the improvement wherein said mirror means comprise:

a plurality of like, relatively small diameter, concave mirrors of equal radius of curvature; and support apparatus including means for mounting said mirrors in a plurality of distinct positions along an arc with radius of curvature equal to the radius of curvature of said mirror, said arc being oriented in a plane which is parallel to the length of said slit such that a hologram may be recorded which includes contributions from each of said mirrors to provide the effect of a hologram developed by the use of a single relatively large diameter concave mirror at the position of said support apparatus.

7. A rainbow hologram produced by the holographic apparatus of claim 6, which hologram comprises a plurality of segments, each sequentially contributing to the holographic field of view, said segments developing a plurality of gaps in the reconstructed image corresponding to the junctures between adjacent pairs of said plurality of mirrors.

8. The holographic apparatus of claim 6 wherein said support apparatus comprises a support member having an arcuate surface adjacent said mirrors, and further including means for affixing said mirrors in predetermined positions along said arcuate surface.

9. The holographic apparatus of claim 8 wherein each of said mirrors is cut to provide a pair of straight, parallel opposing edges.

10. The holographic apparatus of claim 9 wherein said mirrors are mounted with adjacent parallel edges of adjacent mirrors abutting together with minimum gap between them.

11. A rainbow hologram produced by the apparatus of claim 6, which hologram comprises a plurality of segments, each sequentially contributing to the overall holographic field of view.

* * * * *